Patented June 19, 1934

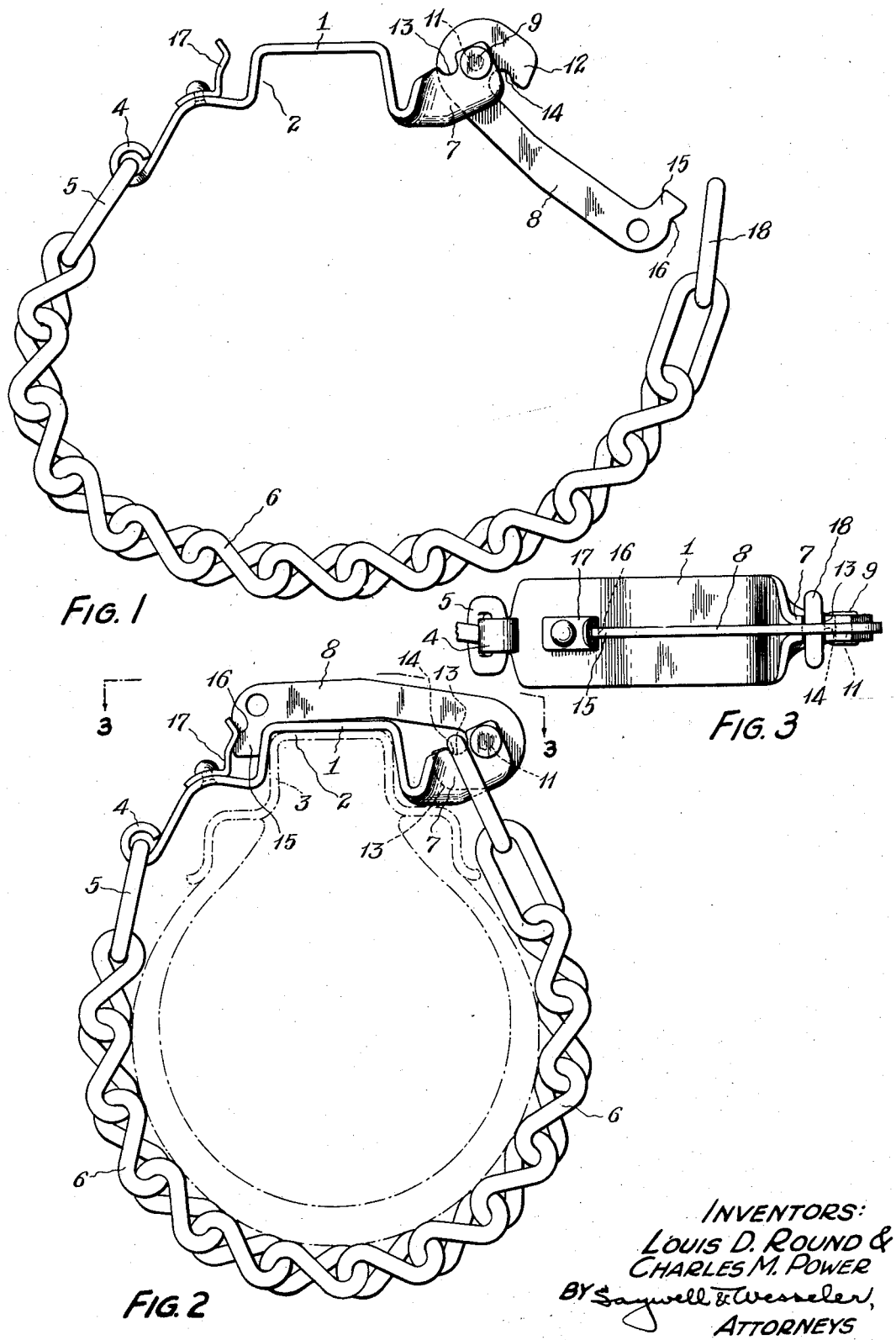

1,963,631

UNITED STATES PATENT OFFICE 1,963,631

EMERGENCY CHAIN

Louis D. Round, Garfield Heights, and Charles M. Power, Kent, Ohio, assignors to The Cleveland Chain & Manufacturing Company, Garfield Heights, Ohio, a corporation of Ohio Application November 25, 1931, Serial No. 577,290

1 Claim. (Cl. 152—14)

This invention, as indicated, relates to an emergency chain. More particularly, it comprises a supporting plate adapted to be engaged with the felly of a spoked wheel of an automobile, and a chain having its ends connected with such plate and having its central portion engaged snugly around the tire. Such chains are more particularly used as emergency chains when one or more wheels fail to get traction in a mud-hole or on similar slippery surface, but their use is by no means limited in this manner as they may also be used to prevent skidding on icy pavements, or to provide traction on grades with heavy loads and for other special purposes, such as increasing the effect of the brakes.

The principal object of the present invention is to provide a strong emergency chain of simple construction and easy of application and detachment and which will remain in adjusted position.

Another object of the invention is to supply a chain structure in which the number of parts is reduced to a minimum and in which the lever serves both as a chain positioning device and as a locking device.

Another object of the invention is to provide a device wherein the chain links themselves are directly engaged at each end with the base plate so that the downward pull of the chain will be directly upon the base plate.

Other and further objects will appear in the course of the following description.

To the accomplishment of the foregoing and related ends, said invention, then, consists of the means hereinafter fully described and particularly pointed out in the claim, the annexed drawing and the following description setting forth in detail certain mechanism embodying the invention, such disclosed means constituting, however, but one of various mechanical forms in which the principle of the invention may be used.

In said annexed drawing:

Fig. 1 is a side elevation showing the apparatus with the parts disposed in position for preliminary engagement; Fig. 2 is a view simlar to Fig. 1 showing the device in locked position about a tire; and Fig. 3 is a top plan view taken along the line 3—3 shown in Fig. 2 looking in the direction of the arrows.

As is clearly shown in the drawing, the device comprises a base plate 1 in the form of a metal strap formed with a recess 2 centrally of a size to engage over the felly 3 of a wheel of an automobile. At one end said strap is narrowed and bent upon itself to form an eye 4 to engage over a terminal link 5 of the chain 6. The terminal link or links of the chain are preferably flat links wherein the central links of the chain are preferably twisted links to provide greater traction when the chain is in use.

At the other end of the base plate the side edges are folded upwardly to provide an upstanding channel member 7, within which one end of the locking lever 8 is adapted to be received. A pivot pin 9 is engaged through the outer portion of the channel member and through an aperture 11 formed centrally of a sharply hooked portion 12 of the lever adjacent its inner end. A pair of notches 13 is provided in the walls of the channel member and a notch 14 in alignment with said pair of notches when the lever is in closed or locking position is provided in the edge of the hooked portion of the lever at the base of the hook. When the lever is moved to releasing position the notch 14 will serve to carry the terminal chain link outwardly and out of seated position in the notches 13 in the channel member.

The outer end of the lever is provided with angularly disposed portion 15 which in the closed or locking position of the lever engages over the central portion of the base plate over the felly of the wheel and extends downwardly adjacent the other end of the base plate. A shallow notch 16 is provided on the outer edge of this angularly disposed portion of the lever, and a spring finger 17 secured by riveting or other suitable means to the base plate serves to ride into this notch to latch the locking lever against accidental displacement.

When in open or releasing position the free end of the lever comes to rest at an angle to the base plate, and the angular portion thereof provides a hook-like member serving as a temporary support for the free end of the chain, while the device is being applied to the wheel. The body portion of the lever serves as a guide for the terminal chain link 18 as this lever is turned to clamping position, and serves to slide said link into the notch 14 of the lever which lifts said link over the upper edge of the channel member and seats said link in the pair of notches 13 of the base plate.

The fact that the terminal link 18 at the free end of the chain passes over the pivot pin of the lever to a position inwardly thereof provides for retaining the locking lever in closed position, but this is further provided for by the engagement of the spring finger with the notch in the outer edge of the lever.

Other modes of applying the principle of our invention may be employed instead of the one explained, change being made as regards the mechanism herein disclosed, provided the means stated by the following claim or the equivalent of such stated means be employed.

We therefore particularly point out and distinctly claim as our invention:

An apparatus of the character described, having in combination, a sheet metal strap shaped to engage about the felly of a wheel and having an eye at one end spaced outwardly of and below said felly, a spring latch member secured to said strap inwardly of said eye in spaced relation to the adjacent body portion of said strap, a length of chain permanently secured to said eye at one end of said strap, an upwardly inclined channel member formed at the opposite end of said strap by the upwardly folded side edges thereof and having a pivot member supported at the free end of said strap substantially in the plane of the body portion of said strap, notched seats formed inwardly of said pivot member, a substantially straight plate-like lever member having end portions projecting at right angles thereto, the intermediate portion thereof serving as a link slideway for the terminal chain link, one of said right angle end portions of said lever being supported on the pivot member at the end of said strap and having a hook-shaped portion on its inner end providing a notch in alinement with the notches in said strap portion when in closed position, and the other right angle end portion being adapted to provide a temporary support for the terminal chain link preliminary to its being guided over the intermediate portion of said lever into tensioned position upon the seats of said strap, the free end of said lever being formed with a notch on its outer edge whereby said right angle portion thereof may be engaged between the adjacent body portion of the strap and said latch member and held in locked position.

LOUIS D. ROUND.
CHARLES M. POWER.